Aug. 2, 1966     E. W. HINES     3,263,964

LIFTING AND LEVELING DEVICE

Filed Nov. 9, 1964

*INVENTOR.*
EUGENE W. HINES

BY

ATTORNEY

United States Patent Office 3,263,964
Patented August 2, 1966

3,263,964
LIFTING AND LEVELING DEVICE
Eugene W. Hines, 4292 Esta Drive, Flint, Mich.
Filed Nov. 9, 1964, Ser. No. 409,738
8 Claims. (Cl. 254—98)

This invention pertains to a lifting and leveling device and more particularly to such a device embodying a relatively solid incompressible material that can flow and thus cause a load-supporting element to be raised.

The invention involves a body having a recess or bore within which a block of elastic relatively incompressible material, such as natural or synthetic rubber, or urethane material, is fitted, and a pad or disc of load-supporting metal, or its equivalent, is disposed upon the rubber block, a threaded bore in the body leading to a surface of the rubber block for threaded advance or retraction of a screw against the rubber block so as to cause its distortion or displacement within the recess or bore. The main body of the device is preferably a steel block of cylindrical or rectilinear configuration having either a round or rectilinear bore in which the block of rubber is disposed in relatively close fitting relationship to the internal surface of the bore. The rubber is a solid mass of natural or synthetic material, relatively incompressible in character, but sufficiently resilient and elastic to flow within the bore of the supporting body when pressure is applied to a surface or surface portion of the rubber block and to return substantially to its original form. By the advance of a screw or pin having a rubber contacting surface applying pressure to such material, the block of rubber responds substantially as does an incompressible liquid in a hydraulic system. The rubber flows within the chamber of the supporting body against surfaces which may yield or be caused to yield. Such a surface is the underside of a load-supporting pad or block, preferably of steel, freely movable in the bore adjacent the upper surface of the supporting body. Upon the advance of a screw or pin against the rubber block, the load-supporting pad will move upwardly to lift and lever heavy loads. As in hydraulic systems, the area of contact with the rubber block at the end of the pin or screw is multiplied, in its force application, in proportion to the area of the lifting pad at its contact surface with the rubber block. Where this ratio is large, the amplification of force can be very great, particularly where relatively small diameter screws are used.

It is an object of the invention to provide a lifting and leveling device embodying a solid relatively incompressible material having a flow characteristic in a supporting body.

It is another object to provide a relatively unyielding supporting body having a bore in which a block of solid relatively incompressible rubber is disposed in the bore under a freely movable pad adapted to support a load.

A further object is to provide screw means with or without a lead pin for contacting a surface or surface portion of the rubber block within the supporting body and upon advance of the screw or pin to cause the rubber to flow within the body.

Yet another object is to provide a force amplification in such device wherein the force applied by the contact area of a screw or pin upon the rubber block is multiplied by its proportion to the area of the rubber block in contact with a surface movable in the device.

Still another object is to provide a relatively simple but effective force multiplication device adapted to lift, level or move a load placed in contiguous position to the lift pad.

These and additional objects of the invention and features of construction will be described below in greater detail and made more clearly apparent in the following description, in which the terms employed are used for purposes of description and not of limitation. Reference is made to the drawing annexed hereto and made an integral part of this specification, in which FIGURE 1 is a perspective view of a device embodying the invention.

Figure 3:
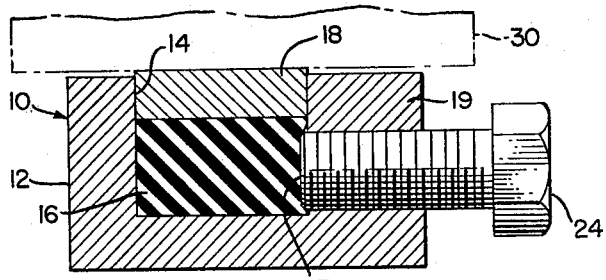
FIGURE 3 is a view similar to FIGURE 2, but showing the lifting pad raised upon advance of the screw.

As shown in the several views of the drawing, the lifting and leveling device 10 comprises a supporting body 12 having a bore 14 within which is disposed a block 16 of solid elastic relatively incompressible material such as natural or synthetic rubber, or urethane material, and a lift pad 18 at rest upon the rubber and freely movable with a slip fit in the bore. Disposed through the wall 19 of the body 12 and directed into the plane of the rubber block 16 is a threaded opening 20 adapted to receive the threaded stem 22 of the screw 24. A modified arrangement is illustrated in FIGURE 3 in which a pin 26 of steel or other suitable material is disposed ahead of the stem 22 for bearing contact upon the rubber block 16.

The supporting body 12, although shown in cylindrical form, can have a rectilinear form, and the bore 14 also a rectilinear form. The supporting body 12 is preferably made of steel, and it may be hardened for use where forces and loads of substantial magnitude will be present.

The screw 24 is also preferably made of steel and may be of any size suitable for particular applications to which the device 10 will be put. The diameter of the screw stem 22 should be selected to provide an area of contact with the rubber block 16 at the lead end 27 of the screw which will cause a substantial flow of the rubber block 16 upon a relatively small advance of the screw where heavy loads are to be lifted or moved. For instance, where a 2¼" diameter x 1.18" thick rubber block 16 was used, a turn of 120° of a 1"-14 thread screw raised the lift pad 18 a distance of .003 inch under load.

The block 16 is made of an elastic solid relatively incompressible material having a flow characteristic when under pressure. This material is generally composed substantially entirely of natural or synthetic rubber, or of urethane material, having a durometer reading of about 40 or higher.

Figure 1:
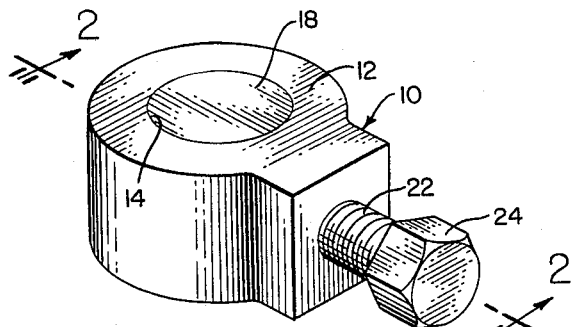
Figure 2:
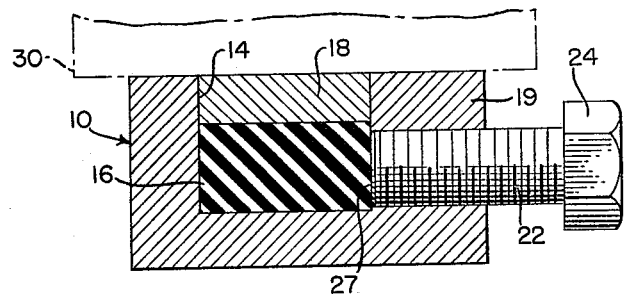
FIGURE 2 is a vertical sectional view taken substantially on the line 2—2 of FIGURE 1.
Figure 4:
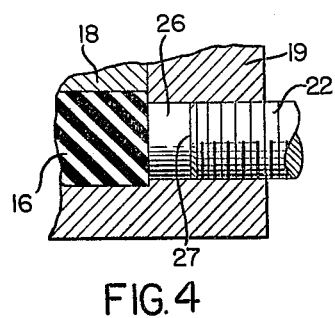
FIGURE 4 is a fragmentary view similar to FIGURE 2, but showing a pin in combination with the screw.

In operation, a load, indicated by the reference numeral 30, is set at rest upon the upper surface of the body 12 and over the lift pad 18. The screw 24, whose lead end 27 is brought into direct bearing contact upon a surface portion of the rubber block 16, is advanced by turning the screw at its head so as to cause the rubber block 16 to flow within the bore 14 and thus left the load 30, as illustrated in FIGURE 3. Alternatively, the pin 26 can be disposed ahead of the stem 22 (as in FIGURE 4), to provide a smooth non-rotating surface applying pressure and force directly upon a surface portion of the rubber block 16, in contrast to the rotative end 27 of the screw, as in FIGURE 2.

It has been found that the rubber block 16 functions substantially as a liquid in a hydraulic system but without some of the limitations which a liquid has under such conditions. For instance, the rubber block 16 does not require a seal to confine and contain it, although it does flow in the bore 14. The entire structure of the device 10 is small by comparison to a conventional hydraulic lifting device to provide substantially the same lifting force, by virtue of the multiplication factor obtained from the ratio of the screw or pin end area to the rubber block-lift pad contact area. Furthermore, a liquid pump is not required, avoiding the problems generally associated with hydraulic pumps, and the cost of manufacturing and producing the device 10 by comparison to a liquid hydraulic device and system is substantially lower. In addition, the application of the device 10 to machines of great weight is easier and much more simple.

Having described the invention in its simplest terms, it is to be understood that the features of construction may be changed and varied in greater or lesser degree without departing from the essence of the invention defined in the appended claims.

I claim:
1. In a lifting and leveling device
    a supporting body having a bore therein,
    a solid elastic resilient relatively incompressible material in block form disposed in said bore at the bottom thereof, a load-supporting pad disposed upon said solid elastic block and in intimate contact therewith within said bore, making a close fitting freely movable fit with said body in said bore and terminating at its upper surface in a plane substantially flush with the surface of said supporting body adjacent said bore,
    and a screw threadedly engaged through a wall of said supporting body into the plane of said solid elastic block for pressure bearing contact with a surface portion of said solid elastic block upon threaded advance of said screw and for compression of said solid elastic block within said bore to effect a flow of said solid elastic block against said load-supporting pad and to displace said pad in said bore.

2. The structure defined in claim 1, wherein said solid elastic block comprises a natural or synthetic rubber.

3. The structure defined in claim 1, wherein said solid elastic block comprises urethane material.

4. The structure defined in claim 1, wherein said bore is substantially cylindrical in configuration.

5. The structure defined in claim 1, wherein the area of said screw in engagement with said solid elastic block is less than the area of said solid elastic block in contact with said load-supporting pad to effect a multiplication of force at the load-supporting surface of said pad upon advance of said screw in compression upon said solid elastic block.

6. In a lifting and leveling device
    a supporting body having a blind recess therein,
    a solid elastic resilient relatively incompressible rubber material in block form and having a durometer reading of at least about 40 disposed in said recess at the bottom thereof,
    a load-supporting pad disposed upon said solid elastic block and in intimate contact therewith within said recess, making a close fitting freely movable fit with said body in said recess and terminating at its upper surface in a plane substantially flush with the surface of said supporting body adjacent said recess,
    and screw means comprising
    a pin slidingly disposed in a bore through a wall of said supporting body into the plane of said solid elastic block for pressure bearing contact with a surface portion of said solid elastic block,
    and a screw threadedly engaged in said wall bore for movement against said pin upon threaded advance of said screw, and for compression of said solid elastic block within said recess to effect a flow of said solid elastic block against said load-supporting pad and to displace said pad in said recess.

7. The structure defined in claim 6, and in which the area of said pin in engagement with said solid elastic block is less than the area of said solid elastic block in contact with said load-supporting pad to effect a multiplication of force at the load-supporting surface of said pad upon advance of said pin in compression upon said solid elastic block.

8. In a lifting and leveling device
    a supporting body having a blind recess therein,
    a solid elastic resilient relatively incompressible rubber material in block form and having a durometer reading of at least about 40 disposed in said recess at the bottom thereof,
    a load-supporting pad disposed upon said solid elastic block and in intimate contact therewith within said recess, making a close fitting freely movable fit with said body in said recess and terminating at its upper surface in a plane substantially flush with the surface of said supporting body adjacent said recess,
    and a screw threadedly engaged in a wall of said supporting body into the plane of said solid elastic block for pressure bearing contact with a surface portion of said solid elastic block upon threaded advance of said screw, and for compression of said solid elastic block within said recess to effect a flow of said solid elastic block against said load-supporting pad and to displace said pad in said recess.

References Cited by the Examiner
UNITED STATES PATENTS
1,678,469  7/1928  Hopkins _____ 254—98

WILLIAM FELDMAN, *Primary Examiner.*

O. M. SIMPSON, *Assistant Examiner.*